United States Patent
Betz

(10) Patent No.: US 9,592,564 B2
(45) Date of Patent: Mar. 14, 2017

(54) METHOD AND ARRANGEMENT FOR PRODUCING A THREE-DIMENSIONAL MATERIAL COMPOSITE USING AN EXPANSION BODY

(71) Applicant: Gerhard Betz, Muelheim a. d. Ruhr (DE)

(72) Inventor: Gerhard Betz, Muelheim a. d. Ruhr (DE)

( * ) Notice: Subject to any disclaimer, the term of this patent is extended or adjusted under 35 U.S.C. 154(b) by 0 days.

(21) Appl. No.: 14/895,466

(22) PCT Filed: Apr. 29, 2014

(86) PCT No.: PCT/EP2014/058747
§ 371 (c)(1),
(2) Date: Dec. 2, 2015

(87) PCT Pub. No.: WO2014/195065
PCT Pub. Date: Dec. 11, 2014

(65) Prior Publication Data
US 2016/0107252 A1 Apr. 21, 2016

(30) Foreign Application Priority Data
Jun. 4, 2013 (DE) .................. 10 2013 105 762

(51) Int. Cl.
*B23K 37/00* (2006.01)
*B23K 20/00* (2006.01)
(Continued)

(52) U.S. Cl.
CPC .............. *B23K 1/0006* (2013.01); *B23K 1/19* (2013.01); *B23K 3/04* (2013.01); *B23K 20/026* (2013.01);
(Continued)

(58) Field of Classification Search
CPC .... B21D 26/055; B21D 47/01; B21D 26/021; B21D 26/025; B21D 26/053; B21D 53/045; B23K 20/023; B23K 20/18; B23K 2201/18
(Continued)

(56) References Cited

U.S. PATENT DOCUMENTS

| 4,049,184 A | 9/1977 | Rozengart et al. |
| 4,087,037 A * | 5/1978 | Schier .................. B23K 20/00 219/85.17 |

(Continued)

FOREIGN PATENT DOCUMENTS

| DE | 196 44 999 C1 | 8/1998 |
| DE | 102 29 994 C1 | 10/2003 |
| EP | 0 535 935 A1 | 4/1993 |

OTHER PUBLICATIONS

International Search Report of International Application No. PCT/EP2014/058747 dated Sep. 16, 2014, 4 pages.
(Continued)

*Primary Examiner* — Erin Saad
(74) *Attorney, Agent, or Firm* — Fay Sharpe LLP

(57) ABSTRACT

A method and arrangement for producing a three-dimensional material composite using an expansion body includes at least two metal bodies having surface regions resting loosely against one another. The composite is heated to a target temperature and the surface regions are pressed against one another so that an integral connection is established. At least one expansion cavity having a predefined initial volume is arranged in one of the metal bodies or in an additional expansion body resting against one of the metal bodies in such a manner that when the expansion cavity expands, the surface regions to be connected are pressed against one another. A predefined quantity of at least one substance which is gaseous at least at a target temperature is
(Continued)

Figure 1:
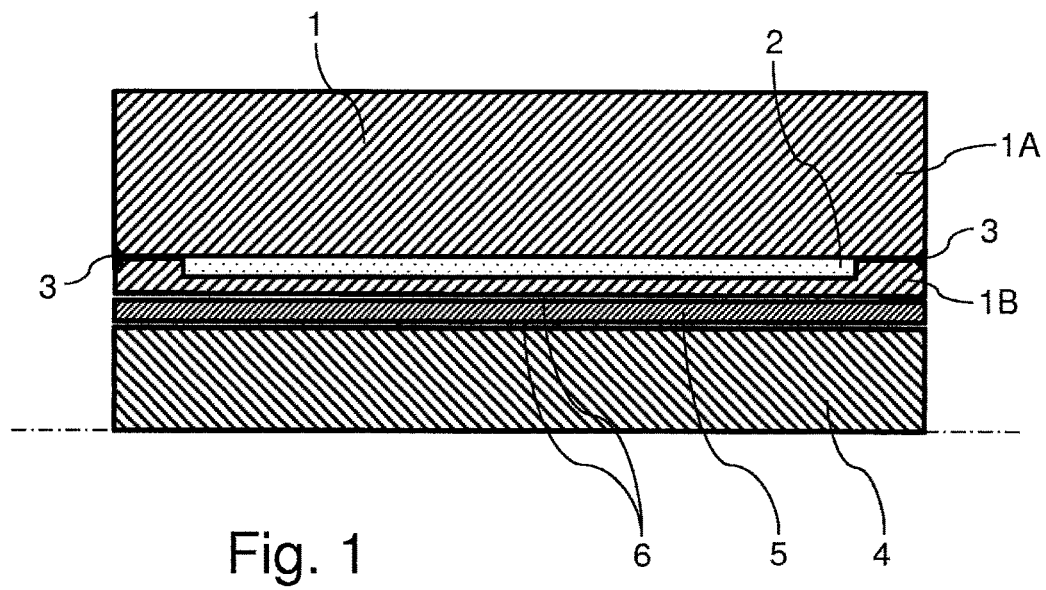

hermetically enclosed in the expansion cavity before the target temperature is reached.

20 Claims, 1 Drawing Sheet

(51) Int. Cl.
  *B23K 20/02*  (2006.01)
  *B23K 1/00*  (2006.01)
  *B23K 20/16*  (2006.01)
  *B23K 20/227*  (2006.01)
  *B23K 1/19*  (2006.01)
  *B23K 3/04*  (2006.01)

(52) U.S. Cl.
  CPC ............ *B23K 20/16* (2013.01); *B23K 20/227* (2013.01); *B23K 2203/04* (2013.01); *B23K 2203/12* (2013.01); *B23K 2203/166* (2015.10); *B23K 2203/22* (2013.01)

(58) Field of Classification Search
  USPC .. 228/44.3, 106, 157, 15.1, 173.2, 193, 212, 228/235.1; 148/693
  See application file for complete search history.

(56) References Cited

U.S. PATENT DOCUMENTS 4,699,673 A * 10/1987 Kobayashi ................ C22F 1/04
                   148/692
4,744,504 A    5/1988 Turner
5,181,647 A * 1/1993 Runyan ................ B21D 26/055
                   228/44.3

OTHER PUBLICATIONS

International Preliminary Report on Patentability/Written Opinion of International Application No. PCT/EP2014/058747 dated Dec. 8, 2015 and English Translation, 10 pages.

\* cited by examiner

METHOD AND ARRANGEMENT FOR PRODUCING A THREE-DIMENSIONAL MATERIAL COMPOSITE USING AN EXPANSION BODY

The invention pertains to a method for producing a three-dimensional material composite of at least two metal bodies, wherein the metal bodies are initially assembled such that the surface areas to be connected loosely abut on one another, wherein said composite is then heated to a target temperature while said surface area are pressed against one another such that no gap remains, and wherein a positive-locking and/or firmly bonded connection is produced between the surface areas of the metal bodies. The invention furthermore pertains to an arrangement for producing a three-dimensional material composite of at least two metal bodies, as well as to an expansion body for use in such a method.

A method of this type, in which a positive-locking and/or firmly bonded connection between metal bodies is produced, for example, by means of a metal diffusion process that takes place under high pressure and at high temperatures, is known from DE 102 29 994 C1.

In this context, the term "three-dimensional" material composite of at least two metal bodies refers to a material composite, in which the surface areas to be connected do not exclusively lie in one plane and the surface areas to be connected therefore cannot be exclusively pressed against one another by means of a force acting perpendicular to the plane.

Three-dimensional material composite systems are used for many applications in the chemical industry, mechanical engineering and tool manufacturing, in which pipelines, aggregates, machine parts, tools or components feature platings, i.e. thick coatings of a plating material that differs from the underlying base material and serves for creating predefined abrasive, chemical or mechanical properties of the layer structure on certain surfaces of the outer contour or on surfaces of interior cavities. For example, pipes or pump housings are provided with an interior plating or shafts are provided with an exterior plating.

Various methods are available for producing such platings. On interior functional surfaces such as walls of bores, sleeves of the plating material are inserted into pipes or bores and tightly welded on the ends. However, this procedure is unsatisfactory in many respects. The existing gap prevents a sound heat transfer and quickly leads to the destruction of the sleeve under a high mechanical load because it lacks support by the base body. If transversely extending connecting channels are provided in the aggregate, this sleeve principle cannot be used at all because a seal in the interior can hardly be produced.

Different methods for plating the interior of pipes have been developed, e.g. explosion plating, roll-bonding with pipe bending and longitudinal seam welding, extruding previously inserted and sealed sleeves or hydraulic, positive-locking internal pressure plating at room temperature with subsequent firmly bonded extrusion at higher temperatures (U.S. Pat. No. 4,744,504; DE 196 44 999 C1), wherein said methods require a significant preparation and implementation effort, are subject to numerous restrictions for technological reasons and usually limited to circular-cylindrical shapes. Attempts to braze in plating sleeves by means of brazing foils failed because the minimal gap, which always exists in cylindrical or other non-planar systems, cannot be completely filled out with brazing metal.

Exterior platings, for example, of shafts are usually produced by means of build-up welding methods that serve for applying thick layers. Another option is the hot-isostatic pressing (HIP) method, in which a workpiece provided with an exterior sleeve or a powder layer is encapsulated in a tight deformable container in a high-pressure chamber and said container is compressed under an inert gas atmosphere in a heatable pressure vessel at temperatures up to 2000° C. and pressures of 100-200 MPa. During this process, the material of the sleeve or the powder is pressed onto the workpiece, e.g. the shaft body, in a positive-locking and force-locking fashion (diffusive connection of the materials at the connected surfaces).

The invention is based on the objective of developing a method and an arrangement that respectively make it possible to produce a three-dimensional, positive-locking and/or firmly bonded material composite of at least two metal bodies without the inherent restrictions of the described methods and with little effort.

According to the invention, this objective is respectively attained by means of a method with the characteristics of claim 1 and an expansion body with the characteristics of claim 18 for use in such a method or by means of an arrangement with the characteristics of claim 21.

In the inventive method for producing a three-dimensional material composite of at least two metal bodies, the metal bodies are initially assembled such that the surface areas to be connected loosely abut on one another. In this context, "loosely abutting on one another" means that the surface areas abut on one another tightly, but not without gaps, wherein macroscopic contours can engage into one another in a positive-locking fashion. This composite is then heated to a target temperature. During this process, the surface areas are pressed against one another such that no gap remains, wherein a positive-locking and/or firmly bonded connection is produced between the surface areas of the metal bodies. In this context, the term "positive-locking" means that the surfaces tightly abut on one another without gaps, wherein interlocking of microscopic surface contours takes place. In order to generate the pressure required for pressing the surface areas against one another, at least one expansion cavity with a predefined initial volume is arranged in one of the (at least two) metal bodies or in an additional expansion body, which abuts on at least one of the (at least two) metal bodies, in such a way that the surface areas to be connected are pressed against one another during its expansion. This formulation implies that at least one expansion cavity must be provided; this expansion cavity may be realized in one of the metal bodies to be connected or in an additional expansion body (not to be connected). However, several expansion cavities may also be provided in one body or expansion cavities may be provided in several bodies. A predefined amount (obsolete term: molar quantity) of at least one substance is filled into the expansion cavity and hermetically confined, wherein said substance is gaseous at least at the target temperature or forms, prior to reaching the target temperature, at least one substance in a predefined proportion that is gaseous at the target temperature, and wherein the inner wall of the expansion cavity consists of a material that cannot absorb the at least one gaseous substance and cannot react therewith such that the amount of the at least one gaseous substance changes. This implies that the substance has to consist of a substance that, at least at the target temperature, results in an exactly predefined amount of a gas or even a mixture of several gases confined in the cavity. In this case, the predefined amount of substance is chosen in such a way that a predefined pressure is reached in the expansion cavity upon reaching the target temperature, wherein said predefined pressure suffices for closing any existing gaps between the surface areas to be connected due to a deformation of the metal body containing the expansion cavity or (if the expansion cavity is located in an expansion body) of the expansion body, respectively, and at least one of the abutting metal bodies (i.e. due to a deformation of a metal body that abuts on the expansion body itself and, if applicable, a deformation of a metal body that in turn abuts on this metal body, etc.).

The fundamental idea of the invention is the utilization of an expansion cavity or several expansion cavities in at least one of the metal bodies or in one or more separate expansion bodies. The inventive expansion body features at least one expansion cavity with a predefined volume, in which a predefined amount of at least one substance is hermetically confined, wherein said substance is gaseous at least at a target temperature or forms, prior to reaching the target temperature, at least one gaseous substance in a predefined proportion, wherein the inner wall of the expansion cavity consists of a material that cannot absorb the at least one gaseous substance and cannot react therewith such that the amount of the at least one gaseous substance changes, and wherein the predefined amount of substance is chosen in such a way that a predefined pressure is reached in the expansion cavity upon reaching the target temperature.

In this case, the expansion cavity or the expansion cavities can be purposefully shaped and arranged in such a way that a stress-strain field matched to the three-dimensional arrangement of the surface areas to be connected is generated in the material composite and the desired deformations and creep motions occur. These depend on the volumes of the expansion cavities and the wall surfaces and wall thicknesses of the walls surrounding this cavity. In the simple instance of producing an interior plating on a circular-cylindrical pipe, for example, an elongate circular-cylindrical expansion cavity with small diameter may be axially arranged in the center of the composite and surrounded by a wall of predefined thickness; it may in this case also be sensible to arrange several (e.g. two to four) separate, shorter expansion bodies with elongate circular-cylindrical expansion cavities axially behind one another in a row in the center of the pipe in order to distribute the deformation of the pipe over its length in a more uniform fashion. For complicated three-dimensional structures, it may be necessary to arrange differently shaped expansion bodies and expansion cavities in the composite.

In an embodiment of the inventive method, a predefined amount of substance is filled into the expansion cavity by introducing a gaseous substance into the expansion cavity at a predefined admission temperature and a predefined admission pressure. In another embodiment of the inventive method, a predefined amount of substance is filled into the expansion cavity by introducing a predefined amount of a solid or liquid substance into the expansion cavity. For example, the solid or liquid substance is introduced with a predefined mass or with a predefined volume (at a predefined temperature, e.g. room temperature). Even combinations of both embodiments would be conceivable. A gas or gas mixture such as, for example, the air quantity present in the cavity at normal pressure and room temperature may be additionally confined during the introduction of the solid or liquid substance. It is preferred to introduce a predefined amount of a hydrocarbon compound (e.g. alcohol or paraffin) and/or water into the expansion cavity.

In a preferred enhancement of the inventive method, the initial volume of the expansion cavity and the predefined amount of substance are matched to the intended expansion of the expansion body due to the closing of the gaps and due to the permissible maximum deformation of the metal bodies in such a way that the expansion process stops due to a pressure drop in the expanded expansion cavity before a permissible maximum deformation of at least one of the metal bodies can be exceeded, wherein the initial volume is adjusted such that a desired rate of the pressure drop is achieved upon reaching the intended expansion of the expansion body. This allows a self-regulation by utilizing the law pressure×volume=constant. The volume of the expansion cavity is adjusted in dependence on the estimated volumes of the gaps to be closed, the desired deformations (expansion), the target temperature and the hot creep resistance of the materials in such a way that—while the composite is maintained at the target temperature—the pressure has upon reaching a predefined maximum expansion dropped to such a degree that it no longer suffices for the continued deformation because the stresses generated in the metal body drop below the creep limit at the given temperature (target temperature). The deformation process (expansion process) comes to a standstill. The rate of the pressure drop at given gap volumes and a given expansion is adjusted by predefining the initial volume of the expansion cavity; a smaller initial volume results in a more significant pressure drop.

An embodiment of the inventive method is characterized in that a layer or foil of a brazing material is placed between or on the surface areas to be connected during the assembly of the loose composite, wherein the brazing material melts at the latest upon reaching the target temperature, fills out the space between the surface areas to be connected and produces a firmly bonded connection with the materials of the surface areas. In comparison with conventional brazing methods, this method has the advantage that the remaining gaps and therefore the cavities between the surface areas to be connected, which would otherwise remain when the brazing metal melts, are closed due to the pressure originating from the expansion cavity such that a tight, closed connecting layer of brazing metal is produced.

Another embodiment of the inventive method is characterized in that an intermediate space filled with metal powder is provided between the metal body containing the expansion cavity or the expansion body on the one hand and a metal body on the other hand, and in that the predefined amount of substance is chosen such that a predefined pressure is at the latest reached in the expansion cavity upon reaching the target temperature, wherein said pressure suffices for compressing and/or sintering the intermediate space filled with metal power into a metal body, and wherein a rigid connection with the surface areas of the abutting metal bodies to be connected is produced. The powder may be contained in an intermediate space between two metal bodies to be connected or in a space between a metal body and an expansion body (not to be connected). In the first instance, the metal powder forms a connecting layer between the two metal bodies; in the second instance, the metal powder forms a plating of a surface after the expansion body has been removed.

In a preferred embodiment of the inventive method, the predefined amount of substance is chosen in such a way that a predefined pressure is at the latest reached in the expansion cavity upon reaching the target temperature, wherein this predefined pressure suffices for producing a positive-locking connection between the surface areas of the metal bodies. In this context, the term "positive-locking" means that the surfaces tightly abut on one another without gaps, wherein interlocking of microscopic surface contours takes place. In addition, the initial volume of the expansion cavity and the amount of substance are in this case preferably dimensioned such that the surface areas to be connected are pressed against one another with such a high pressure that a solid-diffusive metallic connection is produced between the surface areas to be connected if the target temperature is maintained for a predefined holding time or a time-temperature profile above the target temperature is observed. In this case, the target temperature is the temperature, at which the solid-diffusive connection is produced; this target temperature must be reached and maintained for a minimum time period. However, it would also be possible to provide a temperature profile, in which the temperature is additionally increased after the target temperature has been reached, for example, in order to initiate other processes such as, e.g., hardening of an involved material. The temperature profile and the holding times affect the expansion achieved due to creeping of the materials. However, the maximum deformation of the bodies can be limited in the above-described fashion by means of a self-regulation that can be adjusted with the initial volume of the expansion cavity.

An embodiment of the method is carried out in accordance with the following procedure. The expansion cavity of an expansion body is initially filled and sealed. To this end, it would be possible, for example, to provide several expansion bodies that can be used universally and have predefined initial volumes containing predefined amounts of substance. Subsequently, a metal body in the form of a sleeve consisting of a plating material is pushed over the expansion body and this composite is then inserted into a bore or receptacle of matching contour in a metal body to be internally plated. In this context, it would be possible, for example, to push several metal bodies in the form of sleeves consisting of identical or different materials over the expansion body such that they are arranged adjacent to and/or on top of one another. It would likewise be possible to push several sleeves consisting of different materials over one another in order to produce desired multi-layer platings and, for example, to thereby realize functional barrier layers in a sandwich construction.

In an embodiment, a thin intermediate layer of a high-strength material such as, for example, special steel can be arranged between two sleeve materials with high ductility and low strength, for example copper. This is particularly advantageous if the component consisting of the material composite is used as a component that is subjected to high thermal stresses and features internally plated channels for accommodating liquids, particularly cooling liquids. In this case, the inserted layer of the sandwich structure, for example the special steel layer, can fulfill the function of a barrier layer that prevents, for example, an undesirable escape of liquid (leakage) occurring due to hairline cracks in the internal plating layer.

In another embodiment of the method, the expansion cavity of a first metal body consisting of a plating material is initially filled and sealed. Subsequently, the first metal body is inserted into a bore or receptacle of matching contour in a second metal body to be internally plated. In this simple variation, the first metal body simultaneously fulfills the functions of the expansion body and the plating sleeve.

In another embodiment of the method, the expansion cavity of an expansion body is initially filled and sealed. Subsequently, at least one metal body in the form of a sleeve consisting of a plating material is inserted into a bore or receptacle of matching contour in the expansion body and a metal body to be externally plated is then inserted into a bore in at least an innermost sleeve of this composite. The sequence of pushing the sleeves on top of one another may also differ. The externally arranged expansion body may be realized in such a way that it essentially only expands inward—during the expansion of the expansion cavity; for example, it may have a significantly stronger outer cavity wall than its inner wall. The expansion body may also contain several expansion cavities or interconnected expansion chambers that are distributed along its circumference.

In an embodiment of the method, the predefined amount of substance preferably is dimensioned such that the pressure maintained after reaching the target temperature and holding the material composite at the target temperature, as well as subsequent cooling to a lower temperature, is still so high that the stresses generated thereby exceed the hot creep limits of the materials of at least the expansion body and the metal bodies, if applicable with the exception of the metal body arranged farthest from the expansion body. This is particularly advantageous in material combinations with different coefficients of thermal expansion such as, for example, in the application of a copper plating on a steel body. If such a pressure, at which the generated stresses still exceed the hot creep limits of the materials (e.g. of the copper), is maintained until a sufficiently low cooling temperature is reached, the risk of a partial or complete separation of the plating from the surface of the base body can be lowered or eliminated. Tests have shown that the critical temperature zone for such separation processes ends at approximately half the height of the cooling curve such as, for example, at approximately 500° C. if the connecting temperature amounted to approximately 1000° C.

An embodiment of the inventive method is characterized in that the metal body containing the expansion cavity or the expansion body, respectively, as well as the metal bodies that, if present, are arranged directly on or near the expansion body, have a significantly lower hot tensile strength than metal bodies arranged farther from the expansion cavity, preferably only a fraction of the hot tensile strength of the metal bodies arranged farther from the expansion cavity. In this way, the bodies with lower hot creep resistance can be pressed (allowed to creep) from the expansion cavity as far as the body arranged farthest from the cavity. This pressing action can also be realized with layers of an internal plating that in fact do not have a significantly lower hot tensile strength, but a substantially smaller thickness than the outer metal bodies arranged farther from the expansion cavity.

An embodiment of the method is characterized in that the composite is heated to a temperature that lies above the target temperature required for producing the desired positive-locking and/or force-locking connection and corresponds to a predefined temperature for the material treatment of at least one of the metal bodies. This makes it possible, for example, to take into consideration other required production steps such as, e.g., a hardening process and to furthermore utilize these steps for the connecting technique in an energy-saving fashion. For example, at least one metal body may consist of a hardenable metal and the composite may be heated to a hardening temperature of the hardenable metal. Consequently, the already required hardening step (e.g. for hardening a steel base body) can therefore be utilized for the expansion of the expansion body and for the production of the plating (e.g. a copper plating). This applies similarly to a brazing step at a temperature that exceeds the melting temperature of a brazing layer contained in the material composite.

The inventive expansion body is preferably characterized in that the at least one hermetically confined substance comprises a hydrocarbon compound and/or water. Such a substance is inexpensive, can be easily procured and metered and therefore simplifies the introduction of an exact amount.

In a preferred embodiment, the expansion body is characterized in that at least the material of the inner wall of the expansion cavity is copper or a copper alloy. Copper is advantageous in numerous respects. In many applications, it can be advantageously used as a sound heat conductor. It furthermore does not react with many hydrocarbon compounds or water, namely not even at higher temperatures.

The inventive arrangement used for carrying out the inventive method serves for producing a three-dimensional material composite of at least two metal bodies that in the initial state loosely abut on one another with surface areas to be connected to one another, wherein the initially still loose composite is heated to a target temperature in order to produce a rigid positive-locking and/or force-locking connection between the metal bodies and said surface areas are pressed against one another during this heating process. In the inventive arrangement, at least one expansion cavity with a predefined initial volume is arranged in one of the metal bodies or in an additional expansion body, which abuts on at least one of the metal bodies, in such a way that the surface areas to be connected are pressed against one another over the entire surface during its expansion. A predefined amount of at least one substance is hermetically confined in the expansion cavity, wherein said substance is gaseous at least at the target temperature or forms, prior to reaching the target temperature, at least one gaseous substance in a predefined proportion, and wherein the inner wall of the expansion cavity consists of a material that cannot absorb the at least one gaseous substance and cannot react therewith such that the amount of the at least one gaseous substance changes. In this case, the predefined amount of substance is chosen in such a way that a predefined pressure is reached in the expansion cavity upon reaching the target pressure, wherein this predefined pressure suffices for closing any existing gaps between the surface areas to be connected due to a deformation of the metal body containing the expansion cavity or the expansion body, respectively, and at least one of the abutting metal bodies.

In this case, the expansion cavity or the expansion cavities can be purposefully designed and arranged in such a way that a stress-strain field matched to the three-dimensional arrangement of the surface areas to be connected is generated in the material composite and the desired deformations and creep motions occur. These depend on the volumes of the expansion cavities and the wall thicknesses of the walls surrounding this cavity.

For example, the arrangement for producing a three-dimensional material composite of at least two metal bodies is characterized in that the expansion cavity surrounds the bodies to be connected on the outside, and in that the expansion cavity is on the outside enclosed by a rigid body in such a way that it can essentially only expand inward.

In an alternative exemplary embodiment, the arrangement for producing a three-dimensional material composite of at least two metal bodies is characterized in that the expansion cavity is enclosed by the surface areas to be connected.

In a preferred alternative embodiment, the arrangement for producing a three-dimensional material composite of at least two metal bodies is characterized in that the arrangement is essentially cylindrical such that the surface areas to be connected form a surface area of the cylindrical arrangement, and in that the expansion cavity extends in the axial direction between the end faces of the cylindrical arrangement. "Cylindrical" is in this case not limited to circular-cylindrical; in this context, a cylinder refers to a body that is defined by two parallel, plane and congruent surfaces (top and bottom surface) and a surface area or cylindrical surface formed by parallel straight lines. This design simplifies the assembly of the arrangement in that the individual bodies can be pushed on top of one another in the axial direction parallel to the surface area.

In an enhancement of the arrangement for producing a three-dimensional material composite of at least two metal bodies, the metal body containing the expansion cavity or the expansion body, respectively, as well as the metal bodies that, if present, are arranged directly on or near the expansion body, have a significantly lower hot tensile strength than metal bodies arranged farther from the expansion cavity (in this case, for example, the metal body arranged farthest from the expansion cavity is the base body), preferably only a fraction of the hot tensile strength of the metal bodies arranged farther from the expansion cavity. This simplifies the closing of the gaps with a relatively dimensionally stable base body.

In such an arrangement, the metal bodies with the lower hot tensile strength consist, for example, of copper or a copper alloy and the metal bodies with the higher hot tensile strength (e.g. the base body) consist, for example, of steel.

Advantageous and/or preferred embodiments of the invention are characterized in the dependent claims.

Figure 2:
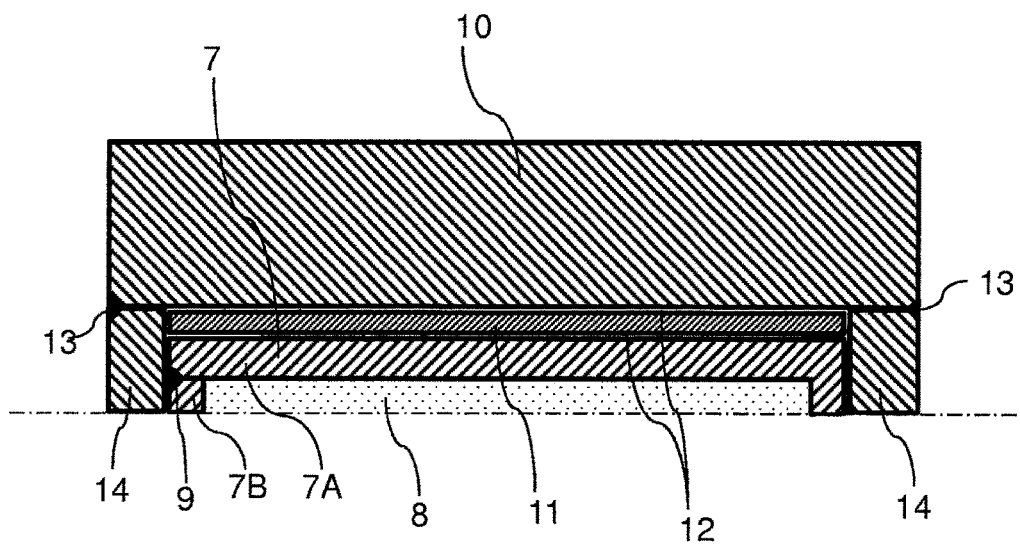

The invention is described in greater detail below with reference to preferred exemplary embodiments that are illustrated in the drawings. In these drawings:

FIG. 1 shows a schematic section through an inventive arrangement suitable for producing an external plating; and FIG. 2 shows a schematic section through an inventive arrangement suitable for producing an internal plating.

The preferred exemplary embodiments described below with reference to FIGS. 1 and 2 concern arrangements, in which a solid-diffusive connection is preferably produced between a base body that consists, for example, of steel and a single-layer or multi-layer internal or external plating, e.g. of copper.

FIG. 1 shows a schematic illustration of a section of an inventive arrangement for producing a three-dimensional material composite, in which a base body 4 of a first material is provided with an external plating of a second material. The sectional illustration of a circular-cylindrical body in FIG. 1 only shows the upper half of the plane of section. The broken line represents the axis of the cylindrical body. A base body 4 consisting, for example, of steel should be provided with an external plating of a second material, for example copper. For this purpose, a sleeve 5 of the second material, i.e. a copper sleeve, is pushed over the base body 4. An expansion body 1 is in turn pushed over the sleeve 5. The expansion body 1 consists of two concentric partial sleeves 1A and 1B, between which a cavity 2 is formed. The two sleeves 1A and 1B of the expansion body 1 are rigidly connected to one another on the axial ends, for example by means of welding seams 3, such that the cavity 2 is hermetically sealed. For example, a predefined amount of a gas is located in the cavity 2 that serves as expansion cavity and has a predefined initial volume. Residual gaps 6 respectively remain between the base body 4 and the sleeve 5 pushed thereon, as well as between the sleeve 5 and the expansion body 1 (due to technology-related roughness and unevenness and due to slightly smaller outside dimensions of the base body 4 in comparison with the inside dimensions of the sleeve 5 in order to allow the sleeve to be pushed on). In the case of a gaseous substance, the amount of substance confined in the expansion cavity 2 is defined by the volume, the temperature and the pressure. For example, the gas is introduced at a predefined temperature and a predefined pressure and a gas-tight connection between the partial sleeves 1A and 1B of the expansion body 1 is produced at this temperature and this pressure. Alternatively, the cavity 2 is closed at room temperature and a predefined amount of a solid or liquid substance such as, for example, a hydrocarbon and/or water, is introduced into the cavity in addition to the air present therein.

After the three-dimensional composite consisting of the base body 4, the sleeve 5 and the expansion body 1 has been loosely assembled, the composite system is heated to a predefined target temperature, at which a connection between the abutting surfaces of the bodies 4 and 5 should be produced. During this heating process, the gas pressure in the expansion body 1 increases and slowly expands the expansion body 1 after the hot creep limit of its material has been exceeded, wherein the expansion body initially abuts on the plating material sleeve 5 during the course of this expansion and thereby closes the gap 6 remaining between the expansion body 1 and the sleeve 5. Subsequently, the plating material sleeve 5 (for example a copper sleeve) is pressed over the base body 4 to be plated after the hot creep limit of the material of the sleeve 5 has been exceeded, wherein the gap 6 between these bodies 4 and 5 is likewise closed. The plating material sleeve 5 abuts on the surface of the base body 4 to be plated in a microscopically tight fashion. Subsequently, the expansion force generated by the expansion body 1, i.e. by the expanding expansion cavity 2, directly acts upon the surfaces of the base body 4 and the sleeve 5 to be connected. The temperature is additionally increased up to the intended final temperature (target temperature) and then maintained until the desired solid-diffusive metallic connection is produced between the materials of the base body 4 and the sleeve 5, for example between the steel of the base body 4 and the copper of the sleeve 5. After the expiration of the holding time, the entire composite is slowly cooled to room temperature. After a positive-locking connection has been produced, i.e. after producing a solid-diffusive connection, it is important that the pressure maintained during the holding time, as well as during the cooling phase, remains so high that the stresses generated by the expansion body 1 exceed the respective hot creep limits of the materials of the expansion body 1 and of the sleeve 5 and a partial or even complete separation of the plating from the plated body is prevented in case they have different coefficients of thermal expansion. Tests have shown that the critical temperature zone for such separation processes ends at the latest at approximately half the height of the cooling curve. At a connecting temperature of approximately 1000° C., the critical temperature zone ends at approximately 500° C. Consequently, a pressure that generates stresses exceeding the respective hot creep limit of the material at the respective temperature in the copper sleeve should be maintained until the composite has been cooled to this temperature, for example, of 500° C.

After the cooling process, the expansion body 1 can be removed from the composite produced of the base body 4 and the plating 5.

FIG. 2 shows a schematic illustration of an inventive arrangement for producing an internal plating. An interior bore of a base body 10 consisting, for example, of steel should be internally plated with a layer of a second material, for example copper. A sleeve 11 of the plating material is inserted into a bore in the base body 10 for this purpose. Subsequently, an expansion body 7 consisting of a cylindrical sleeve 7A and a sealing plug 7B is inserted into the bore of the sleeve 11. An expansion cavity 8 is located in the interior of the expansion body 7. After the insertion of the plating material sleeve 11 and the expansion body 7 into the bore of the base body 10, the bore is sealed on both sides by means of two fixing plugs 14. After the predefined amount of substance has been introduced into the expansion cavity 8 of the expansion body 7 as already described above with reference to the embodiment according to FIG. 1, the cavity 8 is sealed with the plug 7B, wherein the connecting point is welded in a gas-tight fashion. The corresponding welding seam is identified by the reference symbol 9. The fixing plugs 14 are likewise rigidly welded in as indicated with the welding seams 13.

As already described above with reference to FIG. 1, the composite for producing an internal plating illustrated in FIG. 2 is likewise heated to the target temperature and then maintained at this temperature, wherein the resulting pressure in the expansion cavity 8 generates stresses in the composite that exceed the hot creep limits at the target temperature. The expansion body 7 initially is once again pressed outward against the plating material sleeve 11 such that the gap 12 is closed. Subsequently, the plating material sleeve 11 is pressed outward against the wall of the bore in the base body 10 such that the gap 12 at this location is also closed. After the gaps 12 have been closed, the stresses generated by the pressure in the expansion cavity 8 directly act upon the surfaces of the sleeve 11 and the base body 10 to be connected. If this pressure is maintained for a sufficiently long time period, a solid-diffusive connection (sought in the presently described exemplary embodiments) is once again produced.

The pressure resulting during the cooling process once again generates stresses that exceed the hot creep limits of the material of the expansion body 7 on the one hand and of the material of the plating material sleeve 11, for example copper, the other hand. In the case of different coefficients of thermal expansion and therefore different degrees of contraction, this ensures a backfeed of the plating material and thereby prevents a partial or even complete separation of the plating from the base body 10.

In a final production step, the lateral, pressure-absorbing mechanical fixing plugs 14 can be removed and the desired thickness of the plating can be achieved by means of a boring process.

In an enhancement of the described method, the law, according to which the product of pressure and volume is constant, is utilized for realizing a self-regulating deformation process (expansion process), which comes to a standstill at the desired point of deformation, in the material composite. This is achieved in that the predefined volume of the respective expansion cavity 2 or 8 in the respective expansion body 1 or 7 in the initial state (initial volume) is chosen in dependence on the estimated volumes of the respective gaps 6 or 12 to be eliminated, as well as with consideration of the gas pressure generated at the process temperature and the hot creep resistances of the materials involved in the deformation at the process temperature, such that the expansion process ends before the outer body in the case of an internal plating or the inner body in the case of an external plating respectively suffers a no longer tolerable macroscopic deformation. This mechanism of action can be adjusted with the volumetric size of the respective expansion cavity 2 or 11. The smaller this volume is chosen in the initial state, the steeper the pressure drops when the gaps are closed and the outer body (in the case of an internal plating according to FIG. 2) is expanded. The deformation process comes to a standstill when the stresses generated in the outer body 10 fall short of its hot creep resistance as a result of the pressure drop.

Numerous alternative embodiments are conceivable within the scope of the inventive idea. In a simple embodiment, the expansion body is eliminated and the expansion cavity is formed directly in one of the metal bodies to be connected. A plurality of expansion bodies can be introduced adjacent to one another and in other positions in space. Instead of using one plating material layer, several layers of different materials may also be arranged on top of one another. In addition, several plating material sleeves can be arranged adjacent to one another. Furthermore, intermediate spaces between different sleeves may also be filled with a metal powder of a preferred plating material, wherein the powder is compressed and sintered at the occurring process pressures and process temperatures. The connection between the surface areas may consist of a purely positive-locking (microscopically positive-locking) connection or a connection produced due to metal diffusion. Alternatively, a brazed connection may be produced. In this case, a brazing foil may be arranged, for example, between the plating material sleeve and the base material to be plated, wherein said brazing foil melts once the target temperature is reached.

The invention claimed is:

1. A method for producing a three-dimensional material composite of at least two metal bodies, wherein the at least two metal bodies are initially assembled such that surface areas to be connected loosely abut on one another, wherein said composite is then heated to a target temperature and in doing so said surface areas are pressed against one another such that no gap remains, whereby a positive-locking and/or firmly bonded connection is produced between the surface areas of the at least two metal bodies,
   wherein the pressure required for pressing the surface areas against one another is generated by arranging at least one expansion cavity with a predefined initial volume in one of the at least two metal bodies or in an additional expansion body, which additional expansion body abuts on at least one of the at least two metal bodies, in such a way that, during an expansion of the expansion cavity, the surface areas to be connected are pressed against one another,
   wherein a predefined amount of at least one substance is filled into the expansion cavity and hermetically confined, wherein said substance is gaseous at least at the target temperature or forms, prior to reaching the target temperature, at least one substance in a predefined proportion that is gaseous at the target temperature, wherein an inner wall of the expansion cavity consists of a material that cannot absorb the at least one gaseous substance and cannot react therewith such that the amount of the at least one gaseous substance changes,
   wherein the predefined amount of substance is chosen such that a predefined pressure is reached in the expansion cavity upon reaching the target temperature, and wherein this predefined pressure suffices for closing any existing gaps between the surface areas to be connected due to a deformation of the metal body containing the expansion cavity or the additional expansion body, respectively, and at least one of the abutting metal bodies.

2. The method of claim 1, wherein a predefined amount of substance is filled into the expansion cavity by introducing a gaseous substance with a predefined admission temperature and a predefined admission pressure into the expansion cavity.

3. The method of claim 1, wherein a predefined amount of substance is filled into the expansion cavity by introducing a predefined amount of a solid or liquid substance into the expansion cavity.

4. The method of claim 1, wherein a predefined amount of a hydrocarbon compound and/or water is introduced into the expansion cavity.

5. The method of claim 1, wherein the initial volume of the expansion cavity and the predefined amount of substance are matched to the intended expansion of the expansion body due to the closing of the gaps and due to permissible maximum deformations of the at least two metal bodies in such a way that the expansion process stops due to a pressure drop in the expanded expansion cavity before at least one of the permissible maximum deformations of at least one of the at least two metal bodies can be exceeded, wherein the initial volume is adjusted such that a desired rate of the pressure drop is achieved upon reaching the intended expansion of the expansion body.

6. The method of claim 1, wherein a layer or foil of a brazing material is placed between or on the surface areas to be connected during the assembly of the loose composite, wherein the brazing material melts not later than when it reaches the target temperature, fills out the space between the surface areas to be connected and produces a firmly bonded connection with the materials of the surface areas.

7. The method of claim 1,
   wherein an intermediate space filled with a metal powder is provided between the metal body containing the expansion cavity or the additional expansion body and a second one of the at least two metal bodies, and
   wherein the predefined amount of substance is chosen such that a predetermined pressure is reached in the expansion cavity at the latest upon reaching the target temperature, wherein said pressure suffices for compressing and/or sintering the intermediate space filled with the metal power into at least one of the at least two metal bodies, and wherein a rigid connection with the surface areas of the abutting metal bodies to be connected is produced.

8. The method of claim 1, wherein the predefined amount of substance is chosen in such a way that the predefined pressure is reached in the expansion cavity at the latest upon reaching the target temperature, wherein this predefined pressure suffices for producing a positive-locking connection between the surface areas of the at least two metal bodies.

9. The method of claim 8, wherein the initial volume of the expansion cavity and the amount of substance are furthermore dimensioned such that the surface areas to be connected are pressed against one another with such a high pressure that a solid-diffusive metallic connection is produced between the surface areas to be connected if the target temperature is maintained for a predefined holding time or a time-temperature profile above the target temperature is observed.

10. The method of claim 8, wherein the expansion cavity is arranged in the additional expansion body and the at least two metal bodies comprise at least one first metal body and a second metal body,
    wherein the expansion cavity of the additional expansion body is initially filled with the predefined amount of the at least one substance and sealed, and
    wherein the at least one first metal body, which is in the form of a sleeve consisting of a plating material, is then pushed over the additional expansion body and this composite is subsequently inserted into a bore or receptacle of matching contour in a metal body to be internally plated.

11. The method of claim 10, wherein several first metal bodies in the form of sleeves consisting of identical or different materials are pushed over the additional expansion body such that they are arranged adjacent to and/or on top of one another.

12. The method of claim 8, wherein the at least two metal bodies comprise a first metal body and a second metal body, the expansion cavity being arranged in the first metal body,
    wherein the expansion cavity of the first metal body consisting of a plating material is initially filled and sealed and the first metal body is then inserted into a bore or receptacle of matching contour in the second metal body which is meant to be internally plated.

13. The method of claim 8, wherein the expansion cavity is arranged in the additional expansion body, and the at least two metal bodies comprise at least one first metal body and a second metal body,
    wherein the expansion cavity of the additional expansion body is initially filled with the predefined amount of the at least one substance and sealed, then at least one metal body in the form of a sleeve consisting of a plating material is inserted into a bore or receptacle of matching contour in the additional expansion body, and wherein the second metal body to be externally plated is subsequently inserted into a bore in at least an innermost first metal body in the form of a sleeve of this composite.

14. The method of claim 8, wherein the predefined amount of substance is dimensioned such that after reaching the target temperature and holding the material composite at the target temperature as well as subsequent cooling to a lower temperature, the pressure maintained is still so high that the tensions generated thereby exceed the hot creep limits of the materials of at least the additional expansion body and the at least two metal bodies, if applicable with the exception of the metal body arranged farthest from the additional expansion body.

15. The method of claim 8, wherein the metal body containing the expansion cavity or the additional expansion body, respectively, as well as the metal bodies that, if present, are arranged directly on or near the additional expansion body, have a significantly lower hot tensile strength than metal bodies arranged farther from the expansion cavity, preferably only a fraction of the hot tensile strength of the metal bodies arranged farther from the expansion cavity.

16. The method of claim 1, wherein the composite is heated to a temperature that lies above the target temperature required for producing the desired positive-locking and/or force-locking connection and corresponds to a predefined temperature for a material treatment of at least one of the at least two metal bodies.

17. The method according to claim 16, wherein at least one metal body consists of a hardenable metal, and that the composite is heated to a hardening temperature of the hardenable metal.

18. An expansion body for use in a method according to claim 1, wherein the expansion body has an expansion cavity with a predefined volume, in which a predefined amount of at least one substance is hermetically confined, wherein said substance is gaseous at least at a target temperature or forms, prior to reaching the target temperature, at least one gaseous substance in a predefined proportion, wherein an inner wall of the expansion cavity consists of a material that cannot absorb the at least one gaseous substance and cannot react therewith such that the amount of the at least one gaseous substance changes, and wherein the predefined amount of substance is chosen such that a predefined pressure is reached in the expansion cavity upon reaching the target temperature.

19. The expansion body of claim 18, wherein the at least one hermetically confined substance comprises a hydrocarbon compound and/or water.

20. The expansion body of claim 18, wherein at least the material of the inner wall of the expansion cavity is copper.

* * * * *